United States Patent
O. K. Rahmat et al.

(10) Patent No.: US 9,430,836 B2
(45) Date of Patent: Aug. 30, 2016

(54) METHOD OF CONSTRUCTING AT LEAST ONE THREE-DIMENSIONAL IMAGE

(75) Inventors: Rahmita Wirza O. K. Rahmat, Serdang (MY); Mohd Zamrin Dimon, Serdang (MY); Hassan Hadi Khalil, Serdang (MY); Ramlan Mahmod, Serdang (MY); Norwati Mustapha, Serdang (MY)

(73) Assignee: UNIVERSITI PUTRA MALAYSIA, Serdang (MY)

(*) Notice: Subject to any disclaimer, the term of this patent is extended or adjusted under 35 U.S.C. 154(b) by 226 days.

(21) Appl. No.: 13/806,054

(22) PCT Filed: Jun. 20, 2011

(86) PCT No.: PCT/MY2011/000116
§ 371 (c)(1),
(2), (4) Date: Mar. 22, 2013

(87) PCT Pub. No.: WO2011/162593
PCT Pub. Date: Dec. 29, 2011

(65) Prior Publication Data
US 2013/0208959 A1 Aug. 15, 2013

(30) Foreign Application Priority Data
Jun. 21, 2010 (MY) ............................ 2010002959

(51) Int. Cl.
*G06K 9/00* (2006.01)
*G06T 7/00* (2006.01)

(52) U.S. Cl.
CPC .......... *G06T 7/0065* (2013.01); *G06T 7/0012* (2013.01); *G06T 7/0051* (2013.01); *G06T 2200/04* (2013.01); *G06T 2200/24* (2013.01); *G06T 2207/30101* (2013.01); *G06T 2207/30172* (2013.01)

(58) Field of Classification Search
None
See application file for complete search history.

(56) References Cited

U.S. PATENT DOCUMENTS

| | | | |
|---|---|---|---|
| 6,728,566 B1* | 4/2004 | Subramanyan et al. | 600/407 |
| 7,031,517 B1* | 4/2006 | Le et al. | 382/173 |
| 7,113,623 B2 | 9/2006 | Chen et al. | |
| 7,574,024 B2* | 8/2009 | Bitter et al. | 382/128 |
| 7,853,310 B2* | 12/2010 | Vining | A61B 5/1076 382/128 |
| 8,090,173 B2* | 1/2012 | Park | 382/128 |
| 2001/0031920 A1* | 10/2001 | Kaufman | A61B 5/055 600/431 |
| 2002/0106116 A1* | 8/2002 | Knoplioch et al. | 382/128 |

(Continued)

OTHER PUBLICATIONS

Wesarg, S. and Firle, E. "Segmentation of Vessels: The Corkscrew Algorithm", Medical Imaging 2004, SPIE, pp. 1609-1620.*

(Continued)

*Primary Examiner* — Vu Le
*Assistant Examiner* — Samah Beg
(74) *Attorney, Agent, or Firm* — Maschoff Brennan

(57) ABSTRACT

A method of constructing at least one 3 dimensional image from a plurality of data is provided, the method includes the steps of extracting data centerline using a center of gravity formula for at least one image, partitioning the at least one image into a plurality of portions, determining a plurality of gray scale points in each portion, comparing the plurality of gray scale points with a threshold value, determining the center of gravity for each portion and connecting a plurality of center of gravity. A 3 dimensional image constructible from a plurality of data is also provided, the image includes a plurality of 3 dimensional points linearly connectable to form at least one cloud of 3 dimensional points.

7 Claims, 4 Drawing Sheets

(56) References Cited

U.S. PATENT DOCUMENTS

| | | | |
|---|---|---|---|
| 2004/0066958 A1* | 4/2004 | Chen et al. .................... | 382/128 |
| 2006/0122539 A1* | 6/2006 | Lee ....................... | G06T 3/0037 |
| | | | 600/587 |
| 2006/0250386 A1* | 11/2006 | Movassaghi et al. ........ | 345/419 |
| 2007/0031019 A1* | 2/2007 | Lesage et al. ................ | 382/131 |
| 2007/0116342 A1* | 5/2007 | Zarkh et al. ................. | 382/130 |
| 2007/0274579 A1* | 11/2007 | Cai et al. ...................... | 382/131 |
| 2007/0297561 A1* | 12/2007 | Breeuwer et al. ............. | 378/4 |
| 2008/0055473 A1* | 3/2008 | Osawa .......................... | 348/577 |
| 2008/0094389 A1* | 4/2008 | Rouet .................. | G06K 9/0014 |
| | | | 345/419 |
| 2008/0187199 A1* | 8/2008 | Gulsun et al. ................ | 382/131 |
| 2008/0310729 A1* | 12/2008 | Yoshino ........................ | 382/194 |
| 2009/0278846 A1* | 11/2009 | Gulsun et al. ................ | 345/423 |
| 2010/0128940 A1* | 5/2010 | Buelow et al. ............... | 382/128 |
| 2010/0172554 A1* | 7/2010 | Kassab et al. ................ | 382/128 |
| 2011/0026793 A1* | 2/2011 | Goel et al. .................... | 382/131 |
| 2011/0235889 A1* | 9/2011 | Spahn .......................... | 382/132 |
| 2011/0305372 A1* | 12/2011 | Schnorr et al. ............... | 382/110 |
| 2012/0201442 A1* | 8/2012 | Beck et al. ................... | 382/131 |
| 2013/0158970 A1* | 6/2013 | Hof ....................... | G06T 7/0083 |
| | | | 703/11 |

OTHER PUBLICATIONS

Hoover et al. "Locating Blood Vessels in Retinal Images by Piecewise Threshold Probing of a Matched Filter Response", IEEE 2000, pp. 203-210.*

H.C. van Assen et al. "Accurate object localization in gray level images using the center of gravity measure: accuracy versus precision", IEEE 2002, pp. 1379-1384.*

Metz et al. "Coronary centerline extraction from CT coronary angiography images using a minimum cost path approach," Med. Phys. 36 (2009): pp. 5568-5579.*

* cited by examiner

METHOD OF CONSTRUCTING AT LEAST ONE THREE-DIMENSIONAL IMAGE

FIELD OF INVENTION

The present invention relates to a method of constructing at least one 3 dimensional image.

BACKGROUND OF INVENTION

It is known in existing prior art that a coronary artery tree is a system of arteries that supply oxygen and nutrient-rich blood to the muscle. Several medical procedures are carried out to conduct diagnostics in treating cardiac events.

Imaging systems such as angiograms have been used for some time to assist surgeons in viewing the coronary artery tree. U.S. Pat. No. 7,113,623 B2 describes a method for display and analysis of moving arterial tree structures. The document describes a method of visualizing and analyzing a three dimensional representation of a moving vascular tree structure. The method shows a correspondence between sequences of imaging frames. However, this method requires multiple views of the angiogram in order to reconstruct an image.

Most of the known prior art use a biplane approach to produce 3 dimensional reconstruction. Two views are used to construct the 3 dimensional structure. Not all problems require a biplane approach. This is because biplane requires a longer time for calculations and a higher synchronization is required between two views to achieve acceptable reconstruction.

Other aspects involve a pair of time varying arteriographic image sequences to reconstruct a three dimensional representation of the vascular tree structure as it moves through a cardiac cycle. Other approaches involve reconstructing from a rotational digital subtraction angiogram sequences. Most of the above mentioned solutions tend to be rather time consuming and may not be appropriate for use during the course of surgery as information is required on an urgent basis at that time.

Therefore, there is a need for producing a solution that reconstructs medical images for surgeons during the course of surgery in an almost realtime situation to assist surgeons in planning.

SUMMARY OF INVENTION

Accordingly there is provided a method of constructing at least one 3 dimensional image from a plurality of data, the method includes the steps of extracting data centerline using a center of gravity formula for at least one image, partitioning the at least one image into a plurality of portions, determining a plurality of gray scale points in each portion, comparing the plurality of gray scale points with a threshold value, determining the center of gravity for each portion and connecting a plurality of center of gravity.

There is also provided a 3 dimensional image constructable from a plurality of data, the image includes a plurality of 3 dimensional points linearly connectable to form at least one cloud of 3 dimensional points.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENT

The present invention relates to a method of constructing at least one 3 dimensional image from a plurality of data. Hereinafter, this specification will describe the present invention according to the preferred embodiment of the present invention. However, it is to be understood that limiting the description to the preferred embodiment of the invention is merely to facilitate discussion of the present invention and it is envisioned that those skilled in the art may devise various modifications and equivalents without departing from the scope of the appended claims.

The following detailed description of the preferred embodiment will now be described in accordance with the attached drawings, either individually or in combination.

Figure 1:
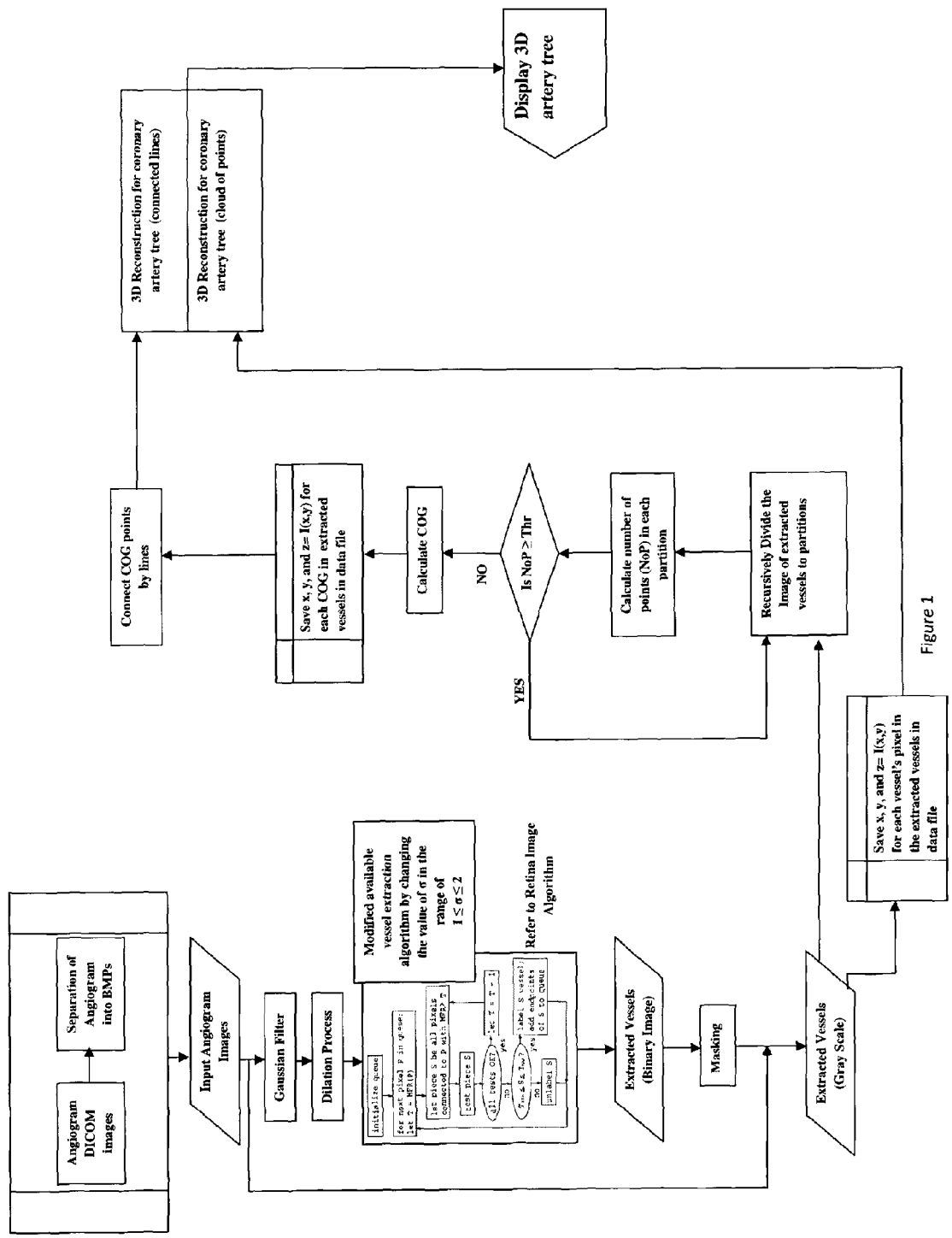
FIG. 1 illustrates a flowchart of an embodiment of a method of constructing at least one 3 dimensional image from a plurality of data.

An embodiment of a method of constructing at least one 3 dimensional image (100) from a plurality of data is shown as a flowchart in FIG. 1.

The method includes the steps of extracting data centerline using a center of gravity formula for at least one image, partitioning the at least one image into a plurality of portions, determining a plurality of gray scale points in each portion, comparing the plurality of gray scale points with a threshold value (T), determining the center of gravity for each portion and connecting a plurality of center of gravity.

Pluralities of images, such as moving digital imaging and communications in medicine (DICOM) angiograms are processed. The angiograms are preprocessed to separate the angiograms into a computer readable format such as BMP images to use the angiograms as a single-view angiogram. The separated angiograms are used as an input for extracting vessel algorithm. Gaussian filter and dilation process are applied to make the extraction process easier and remove any preprocessing noise.

A Retinal vessel extraction is applied on at least one angiogram with an improvement where the retinal algorithm is modified to fit with the at least one angiogram and used to extract coronary artery tree vessels. Standard deviation a is changed in within a range of $1 \leq \sigma \leq 2$. This modification will improve the retinal algorithm to be acceptable for coronary artery tree vessel extraction.

The images of extracted vessels are in a binary form wherein background used is black and white vessels. A masking process is applied on the extracted binary vessels with an original gray scale angiogram to produce a plurality of new images with black background and gray scale vessels. The extracted vessels information $(x, y, z=I(x,y))$ is saved in a data file and kept for further steps such as 3 dimensional construction of at least one cloud of 3 dimensional points.

The plurality of new images are recursively divided into partitions and dealt with in further steps which is less complex than dealing with the plurality of images as one whole package. The plurality of images are divided using Recursive data structure technique. The number of gray scale value points per each partition is calculated. A threshold value (Thr) is set and compared with a number of points (NoP) with this threshold value. If NoP is larger than Thr, then the partition is divided again and the comparison is performed again.

A Center of Gravity (COG) point is calculated for a specific partition using a suggested formula. The formula involves the gray scale value in a format as a vital factor in calculating COG point to track the gray scale vessels till the end of the at least one image and stop. The calculation of x values for COG for each partition by summing number of occurrences of x location and the gray scale values for each pixel in the particular partition. The calculation of y values for COG for each partition by summing number of occurrences of y location and the gray scale values for each pixel in the particular partition.

$$Xcog = \frac{\sum_{i=x1}^{x2} \sum_{j=y1}^{y2} (i*g(i,j))}{\sum_{i=x1}^{x2} \sum_{j=y1}^{y2} g(i,j)} \quad (1)$$

$$Ycog = \frac{\sum_{i=x1}^{x2} \sum_{j=y1}^{y2} (i*g(i,j))}{\sum_{i=x1}^{x2} \sum_{j=y1}^{y2} g(i,j)} \quad (2)$$

Further, the calculated COG points are connected using lines. This step is performed to provide more information about the vessels points and to increase knowledge about vessels points and relationship of each vessel branch to the vessel points. The COG points information (Xcog, Ycog, Zcog=I(Xcog,Ycog)) are saved in a data file to use for further steps of 3 dimensional construction of connected lines.

A user interface is used by to choose type of 3 dimensional construction. A user may select 3 dimensional coronary artery tree of at least one cloud of 3 dimensional points or a linearly connectable 3 dimensional coronary artery tree. A computer implementation means is used to reconstruct the 3 dimensional coronary artery tree from at least one cloud of 3 dimensional points that were saved. The computer implementation means is further used to reconstruct a coronary artery tree from the data saved. The 3 dimensional image (100) is constructed from 3 dimensional points connected with lines which would give more information and details about relationships of each point to each vessel branch. The 3 dimensional image (100) is constructible from at least one single view angiogram.

As described above, the preferred embodiment of the invention is applied in a stage by stage approach. In a first stage, the vessel is extracted and labeled to locate outline of coronary artery tree blood vessels in angiograms. This is an improvement over prior art where the preferred embodiment of the present invention automatically segments the coronary arteries from the angiograms followed by accurate extraction of vessel features. The segmentation step further includes matching a filter for blood vessels and thresholding by using high level programming code to execute algorithm in a computer implementation means. Each location for each vessel point (x value and y value) and each pixel value (intensity of the vessel point) which is represented by a z value is saved in an external location. At this stage, background is ignored and the plurality of gray scale points values (1-255), depth information (z values) and location of each vessel point (x value and y value) is saved in the external location.

At least one cloud of 3 dimensional points are connected by means of formula, i.e equation 1 and 2 as seen above, that leads to centerline extraction. The method uses x, y and z dimensions. The x value and y values are considered Cartesian coordinates for the angiograms, meanwhile the z value would be a gray scale value for the vessel. By interacting with a graphics library, data is displayed without sacrificing a sense of depth and with a continuous coronary tree. This interactivity between the high level programming and the graphics library, the 3 dimensional construction of a coronary artery tree is performed from a single segmented projection. In a next stage, high level programming code is used to read the x, y and z values.

Centerline extraction is further described herein for determining the center of gravity (COG). Angiogram partitioning is conducted using Recursive segmentation technique to divide an angiogram into a plurality of portions. Next, the gray scale points in each partition are calculated and compared with a threshold value. The COG is then calculated for each partition with the equations (1) and (2). If the calculated plurality of gray scale points per partition is larger than or equal to the threshold value, said partition is divided further and recalculated. Finally, the COG is connected using the calculations from the previous step.

Figure 2:
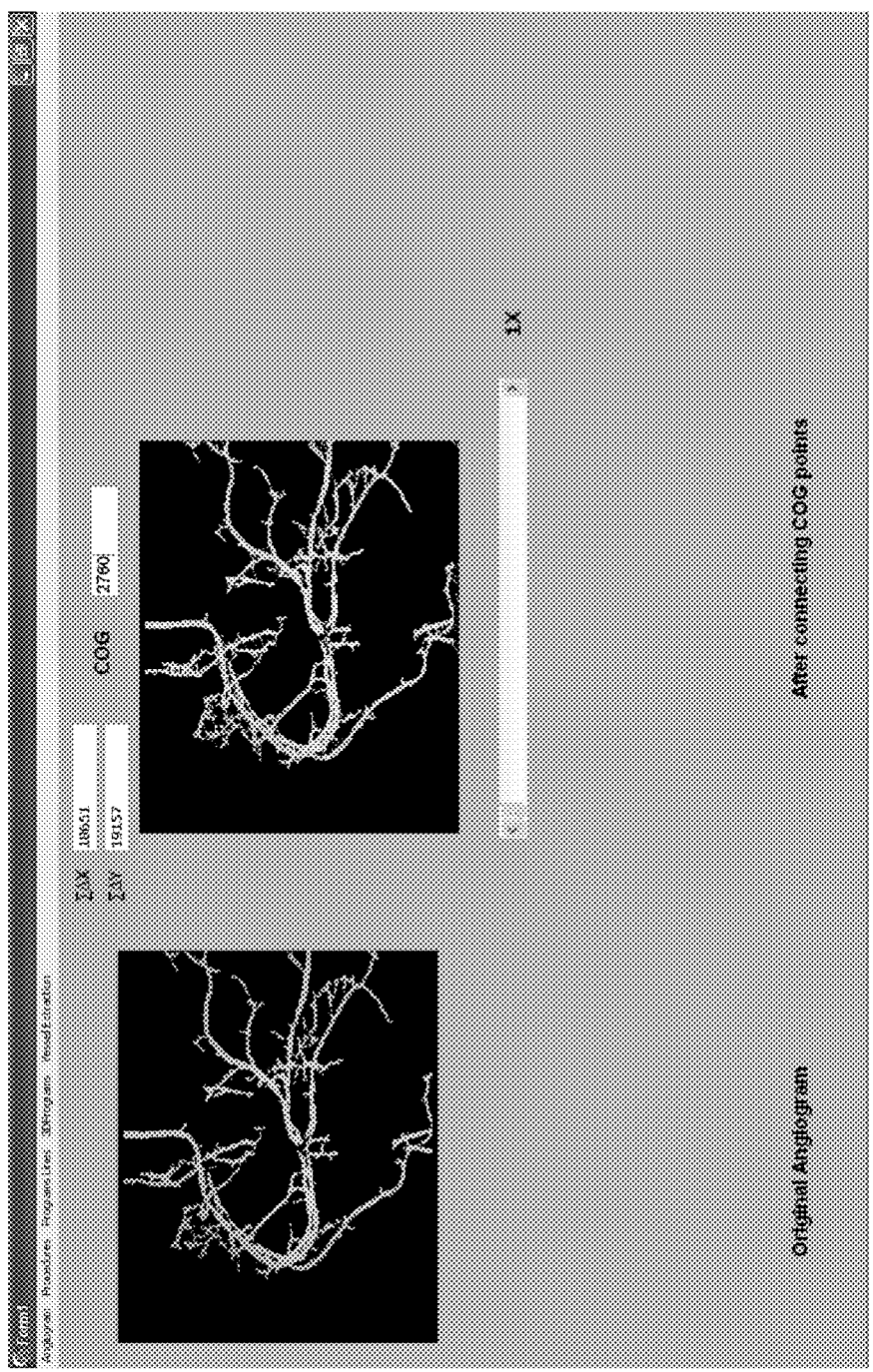
FIG. 2 illustrates an output produced using a method described in prior art by point to point connection.
Figure 3:
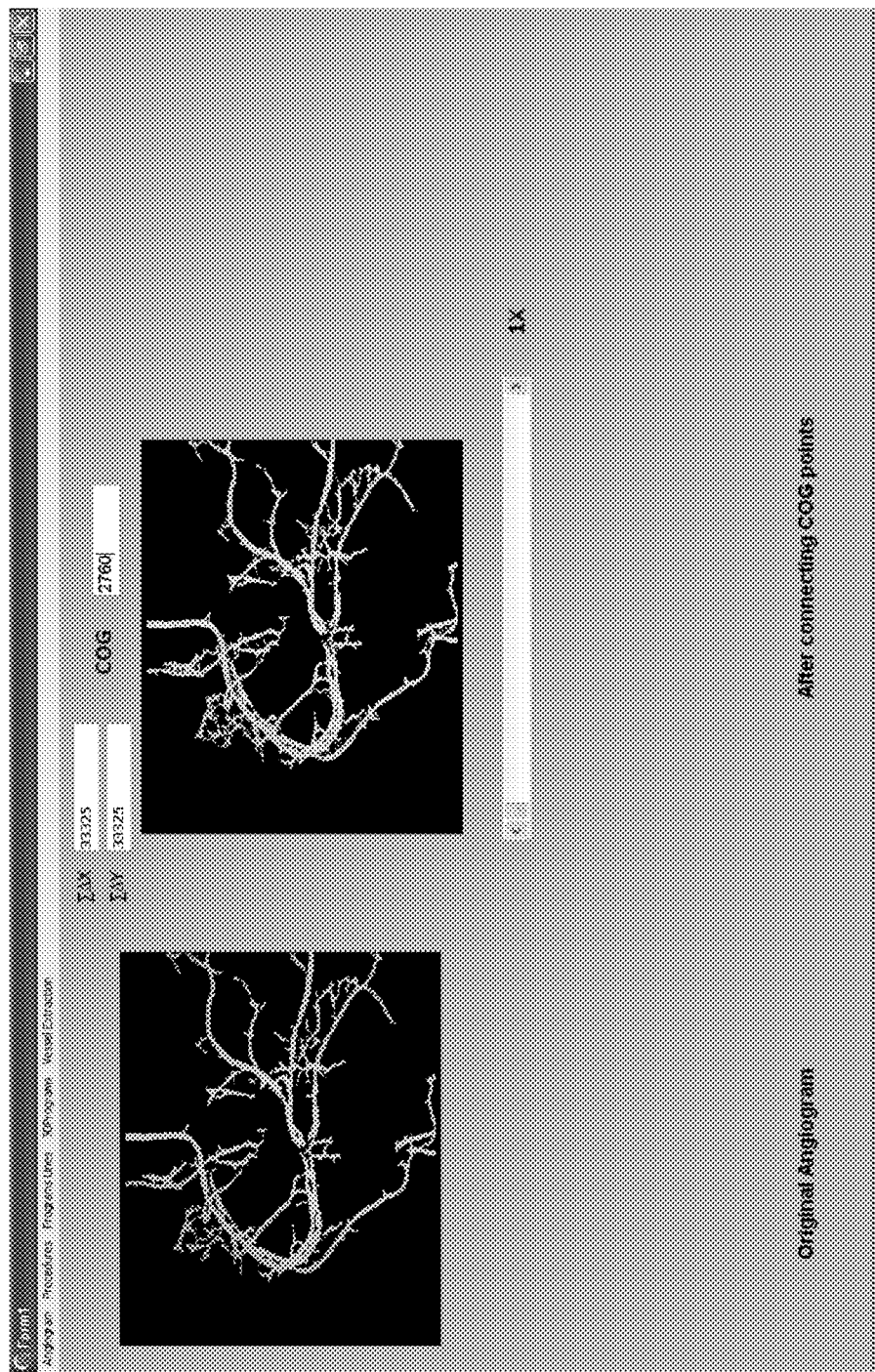
FIG. 3 illustrates an output produced using the preferred embodiment of the method.

Experimental results have shown that the method shows a high robustness in extracting vessels and centerlines compared to those of the prior art as seen in FIG. 2 and FIG. 3. FIG. 2 shows point to point connection as described by prior art. FIG. 3 shows construction of image using the present invention.

Figure 4:
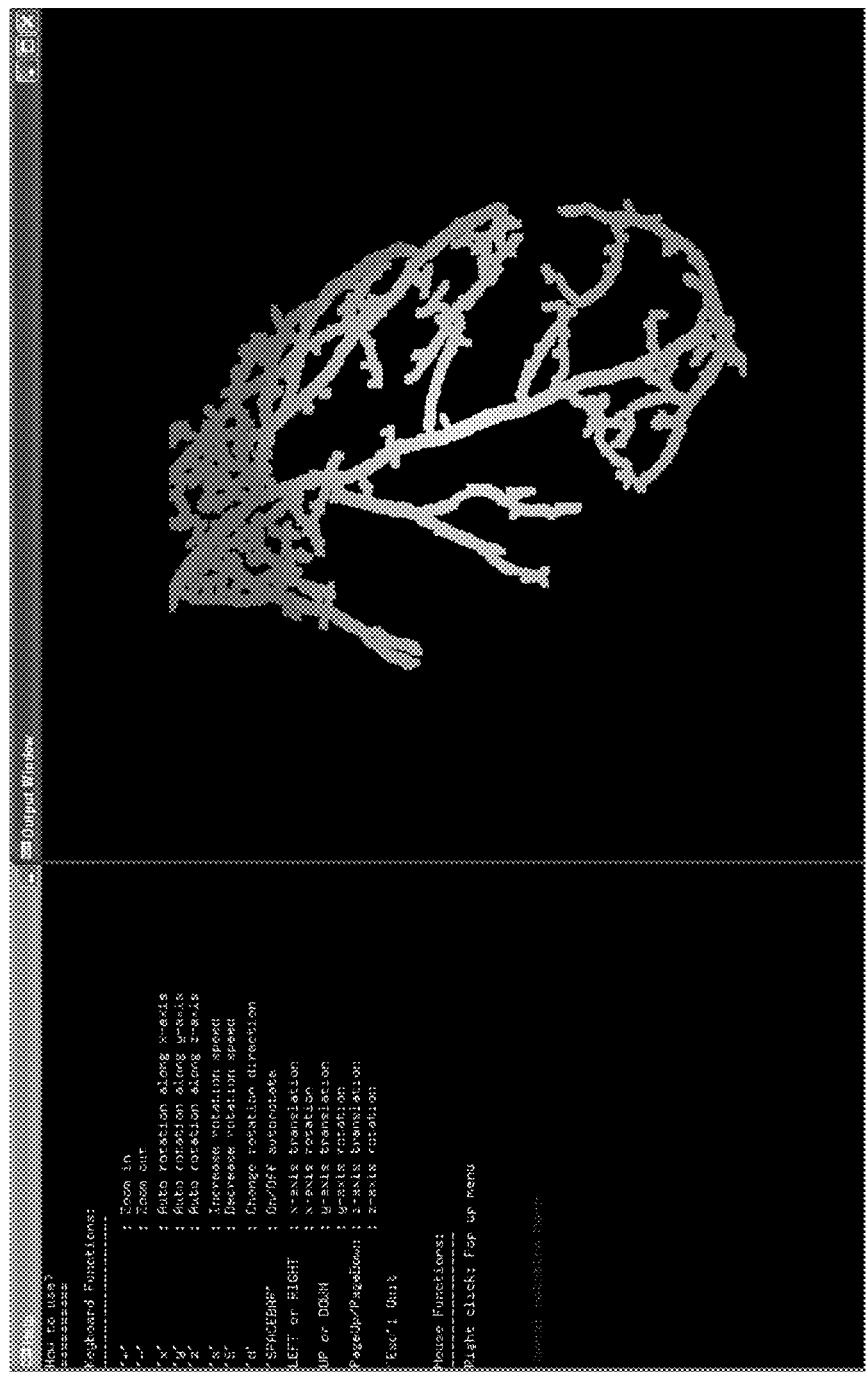
FIG. 4 illustrates a graphical representation of test results using the preferred embodiment of the method.

An experiment was conducted to compare 3 dimensional features with a standard algorithm such as Paraboloid Fitting (PF). The comparison was conducted by using standard deviation to compute differences between two 3 dimensional shapes of a same object such as a coronary artery tree. The method was tested with 100 angiogram images with a chosen view. As seen in FIG. 4, the method results in correct curvilinearity.

The method as described above can be used to indicate location of coronary artery form heart muscle that can be used in surgery planning. In some cases, coronary artery position may be difficult to be determined from angiograms alone, therefore the method fulfils a need to provide a 3 dimensional structure for better viewing. Most prior art used biplane aspects to reconstruct a 3 dimensional coronary artery tree. The 3 dimensional coronary artery tree can be constructed in 3 to 4 seconds using the method as described above. The method may be used to in various applications such as studying dynamic variations of coronary arterial curvilinearity in 3 dimensional format, scientific studies, diagnostics of possible diseases and surgery planning. This is because the method provides more information rather than just a cloud of points by adding a stage of center of gravity calculation.

Though the example presented here has been taken from the surgical field, it is to be appreciated however, that this invention is not limited to use in the surgical field only and may be used in other applications such as computer graphics, medical imaging and cardiothoracic surgery.

The invention claimed is:

1. A method of constructing at least one 3 dimensional image from a plurality of data, the method comprising:

extracting and labeling vessel information from at least one image, wherein the vessel information is represented by a plurality of gray scale value points;

partitioning the at least one image into a plurality of portions;

determining a plurality of gray scale value points in each portion of the plurality of portions;

calculating the number of gray scale value points for each portion of the plurality of portions;

comparing each of the number of gray scale value points for each portion of the plurality of portions with a threshold value, wherein:

when the number of gray scale value points for a given portion of the plurality of portions is less than the threshold value, determining a center of gravity for the given portion of the plurality of portions based at least in part on the plurality of gray scale value points in the given portion, and when the number of gray scale value points for a given portion of the plurality of portions is larger than or equal to the threshold value, the given portion is further divided into a plurality of portions and the determining, calculating and comparing steps are repeated for each portion of the plurality of portions; and connecting at least a subset of the centers of gravity of each of the plurality of portions to extract a vessel centerline.

2. The method as claimed in claim 1, wherein the method further comprises saving the vessel information in an external location.

3. The method as claimed in claim 2, wherein the vessel information is saved as x, y and z values in the external location.

4. The method as claimed in claim 1, wherein the at least one image is a single view angiogram.

5. The method as claimed in claim 1, wherein the method is performed on a single segmented projection that results in a 3 dimensional image.

6. The method as claimed in claim 5, wherein the 3 dimensional image is a 3 dimensional coronary artery tree.

7. The method as claimed in claim 1, wherein the plurality of gray scale value points are represented by z-dimension.

* * * * *